United States Patent
Tanjima et al.

(10) Patent No.: US 9,218,337 B2
(45) Date of Patent: Dec. 22, 2015

(54) TEXT EDITING APPARATUS AND STORAGE MEDIUM

(75) Inventors: Naoki Tanjima, Nissin (JP); Tomoki Miyashita, Nagoya (JP); Takao Kato, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 463 days.

(21) Appl. No.: 12/217,686

(22) Filed: Jul. 8, 2008

(65) Prior Publication Data

US 2009/0106283 A1 Apr. 23, 2009

(30) Foreign Application Priority Data

Jul. 9, 2007 (JP) .................................. 2007-179421

(51) Int. Cl.
*G06F 17/30* (2006.01)
*G06F 7/00* (2006.01)
*G06F 17/27* (2006.01)

(52) U.S. Cl.
CPC .................................. *G06F 17/276* (2013.01)

(58) Field of Classification Search
CPC .................................................... G06F 3/1201
USPC ......................................................... 707/708
See application file for complete search history.

(56) References Cited

U.S. PATENT DOCUMENTS

| | | | | |
|---|---|---|---|---|
| 4,445,871 A * | 5/1984 | Becker | ........................... | 434/114 |
| 4,749,353 A * | 6/1988 | Breedlove | ............. | G06F 17/273 |
| | | | | 434/169 |
| 4,798,543 A * | 1/1989 | Spiece | ................... | G09B 5/065 |
| | | | | 434/323 |
| 4,850,026 A * | 7/1989 | Jeng | ........................ | G06K 9/46 |
| | | | | 382/155 |
| 5,406,317 A * | 4/1995 | Shimamura et al. | ............. | 347/23 |
| 5,535,119 A * | 7/1996 | Ito | ........................ | G06F 17/2863 |
| | | | | 704/3 |
| 6,646,573 B1 * | 11/2003 | Kushler et al. | ................... | 341/28 |
| 7,717,712 B2 * | 5/2010 | Brun | ...................... | G06F 17/274 |
| | | | | 434/156 |
| 7,760,946 B2 * | 7/2010 | Geidl | .................. | G06K 9/00181 |
| | | | | 382/100 |
| 2003/0110464 A1 * | 6/2003 | Davidson et al. | ................ | 716/17 |
| 2004/0117739 A1 * | 6/2004 | Challenger et al. | ............ | 715/531 |
| 2004/0139404 A1 | 7/2004 | Kawashima et al. | | |
| 2004/0246228 A1 * | 12/2004 | Nurmi | ............................ | 345/156 |
| 2005/0128181 A1 * | 6/2005 | Wang et al. | .................... | 345/156 |
| 2005/0210020 A1 * | 9/2005 | Gunn et al. | ........................ | 707/3 |

(Continued)

FOREIGN PATENT DOCUMENTS

| | | |
|---|---|---|
| JP | 9-016585 A | 1/1997 |
| JP | 2000259617 | 9/2000 |
| JP | A-2000-259617 | 9/2000 |

OTHER PUBLICATIONS

Japanese Office Action in JP 2007-179421 of Feb. 24, 2012.

(Continued)

*Primary Examiner* — Pavan Mamillapalli
(74) *Attorney, Agent, or Firm* — McCarter & English, LLP

(57) ABSTRACT

A text editing apparatus is disclosed, which comprises a display device; an operation device; a conversion candidate creating portion that creates at least one conversion candidate associated with a character and outputs a signal for displaying the created conversion candidate; a finally-determined character string output portion that outputs a signal for displaying the corresponding conversion candidate; and a learning portion that learns and storing character string data for the next creation of said conversion candidate at the time of an input of a learning instruction different from the time of the input of said selective final determination.

4 Claims, 13 Drawing Sheets

(56) References Cited

U.S. PATENT DOCUMENTS

| | | |
|---|---|---|
| 2005/0283358 A1* | 12/2005 | Stephanick et al. ............... 704/7 |
| 2006/0167935 A1* | 7/2006 | Atarashi et al. ............ 707/104.1 |
| 2006/0242607 A1* | 10/2006 | Hudson ......................... 715/863 |
| 2007/0016572 A1* | 1/2007 | Bates et al. ....................... 707/5 |
| 2007/0061753 A1* | 3/2007 | Ng et al. ....................... 715/816 |
| 2007/0115343 A1* | 5/2007 | Lessing ...................... 348/14.01 |
| 2008/0114591 A1* | 5/2008 | Williamson .................... 704/10 |
| 2008/0183673 A1* | 7/2008 | Gao et al. ......................... 707/3 |

OTHER PUBLICATIONS

Japanese Office Action of JP 2007-179421 dated May 11, 2012.

* cited by examiner

[FIG. 2]

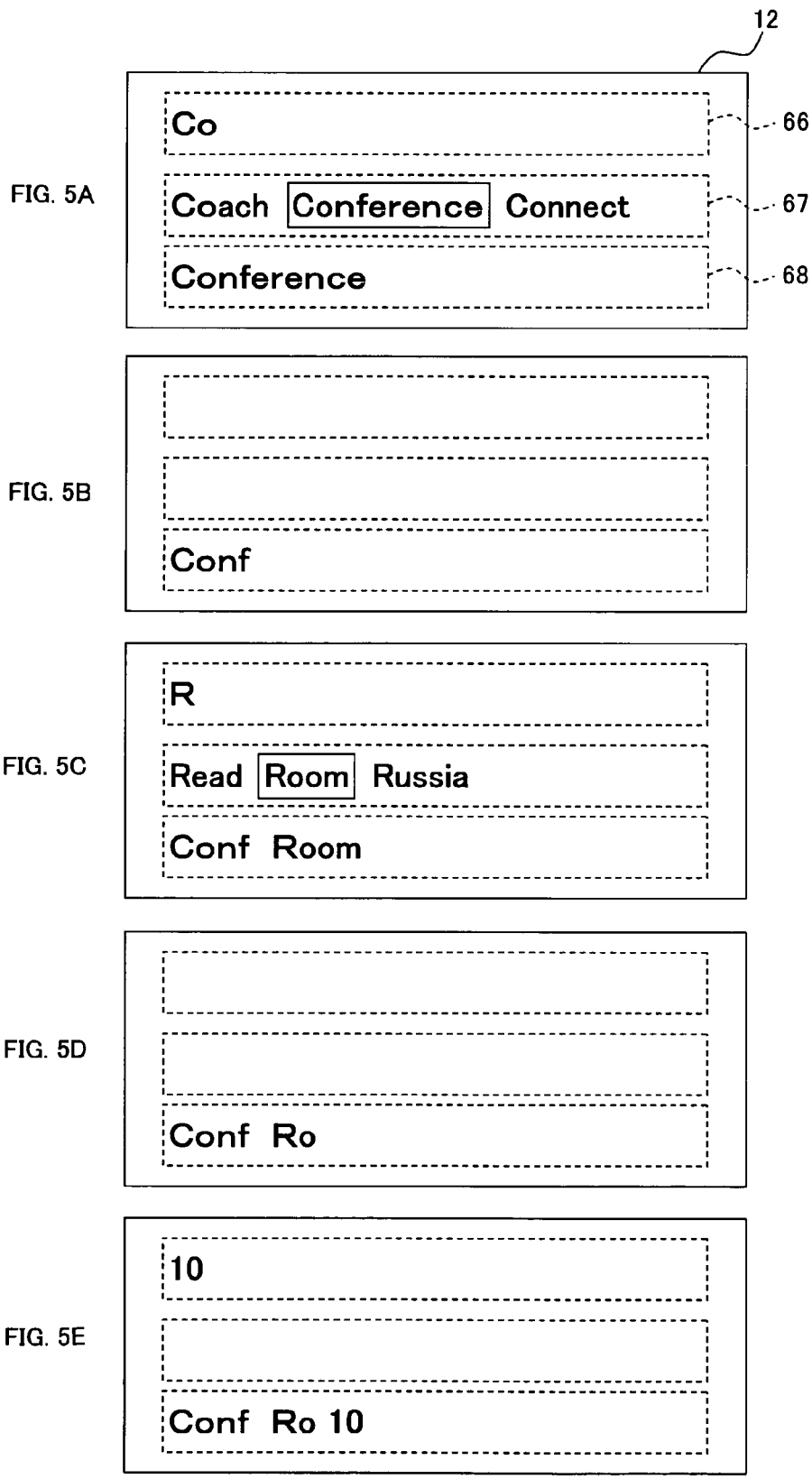

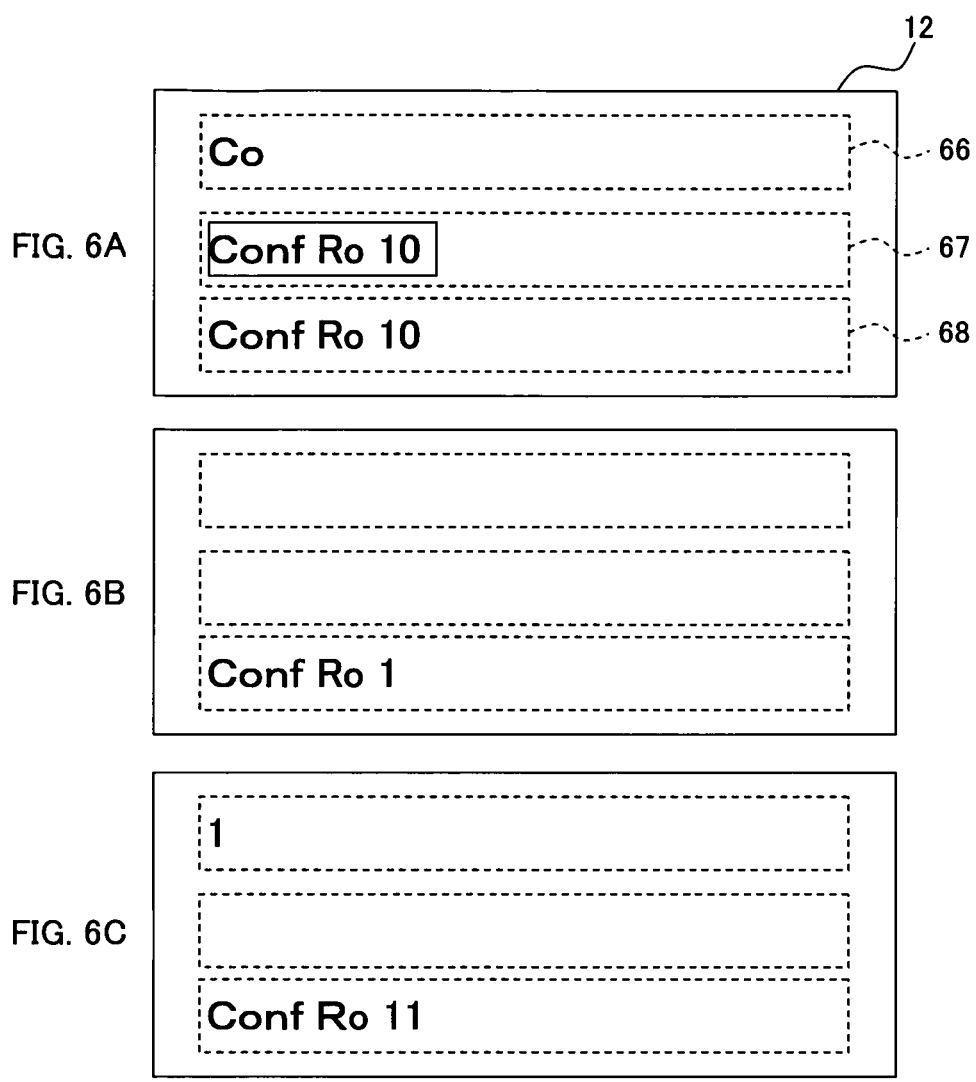

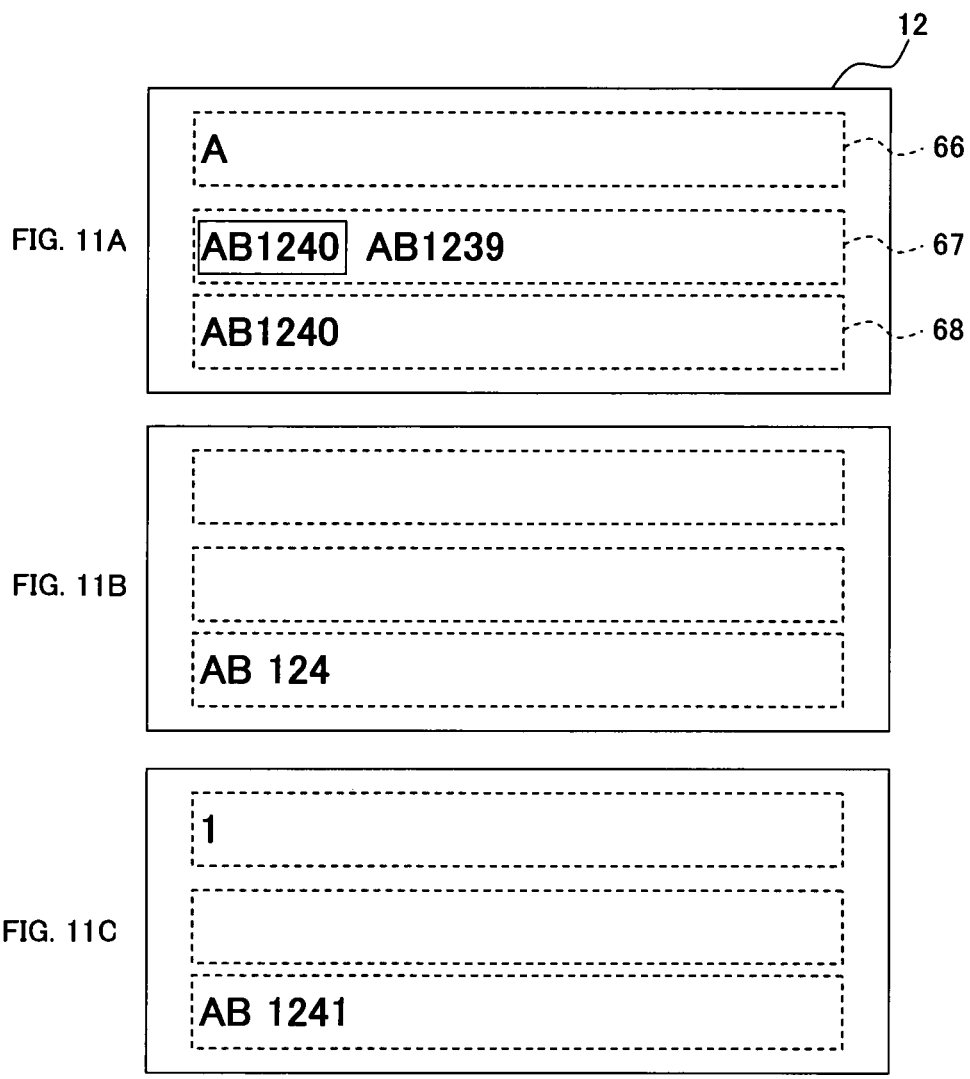

TEXT EDITING APPARATUS AND STORAGE MEDIUM

CROSS-REFERENCE TO RELATED APPLICATIONS

This application claims priority from JP 2007-179421, filed Jul. 9, 2007, the contents of which are hereby incorporated by reference.

BACKGROUND

1. Field

The present disclosure relates to a text editing apparatus that edits a text based on operation input by an operator.

2. Description of the Related Art

A text editing apparatus that creates and displays a plurality of character string conversion candidates when an operator inputs an operation is known. As a prior art concerning such a text editing apparatus, there is one disclosed in, e.g., JP, A, 2000-259617. In this prior art, an operator selects a character string that the operator wants to convert from created and displayed character strings as conversion candidates, and performs final determination input. A text editing apparatus carries out learning for associating the character input effected by the operator before creating the conversion candidates with character string data at the time of selective final determination input by the operator based on this final determination input operation (learning upon final determination).

As explained above, in the prior art, learning is performed at the time of selective final determination input by an operator (learning upon final determination). In this case, however, when the operator executes, e.g., input of character string data, display of conversion candidates, selective final determination input, editing a finally-determined character string (e.g., deletion/addition of a character), and printing (or storage) in the mentioned order, editing (e.g., deletion/addition of a character) after the selective final determination is not reflected in a character string that is displayed as a candidate at the time of the next conversion. Therefore, even if the operator wants to print or store the same character string again, he/she must perform the same editing with respect to a displayed candidate, which is inconvenient.

SUMMARY

It is an object of the present disclosure to provide a text editing apparatus that can reduce an operation burden at the time of editing, and a recording medium able to be read by a computer.

To achieve this object, an aspect of the present application comprises a display device that displays a character string; an operation device that enables an operator to input an operation; a conversion candidate creating portion that creates at least one conversion candidate associated with a character input by the operator with the operation device and outputs a signal for displaying the created conversion candidate in the display device; a finally-determined character string output portion, based on an input of a selective final determination by the operator with the operation device associated with display of the conversion candidate in the display device, that outputs a signal for displaying the corresponding conversion candidate as a finally-determined character string in the display device; and a learning portion that learns and stores character string data displayed in the display device for the next creation of the conversion candidate at the time of an input of a learning instruction by the operator with the operation device different from the time of the input of the selective final determination by the operator with the operation device.

In the aspect of the present disclosure, when the operator uses the operation device to input characters, the display device displays at least one conversion candidate created by the conversion candidate creating portion. When the operator sees this displayed conversion candidate and uses the operation device to perform selective final finally-determination input, the determined character string output portion creates a conversion candidate associated with this final determination input as a finally-determined character string, and the display device displays this character string. The character string displayed in the display device in this manner is printed on a printing object or output to storage device to be stored, for example.

Here, character string data at the time of input of the selective final determination by the operator is usually learned (learning upon final determination). In this case, when the operator executes, e.g., input of the character string data, display of the conversion candidate, selective final determination input, editing the finally-determined character string (e.g., deletion/addition of a character), and print (or storage) in the mentioned order, editing after the selective final determination (e.g., deletion/addition of a character) is not reflected in a character string that is displayed as a candidate in the next conversion. Therefore, even if the operator wants to print or store the same character string again, he/she must perform the same editing again with respect to the displayed candidate, which is inconvenient.

On the other hand, according to the aspect, when the operator inputs a predetermined learning instruction, the learning portion learns and stores character string data displayed in the display device at this moment. That is, the learning/storage device does not learn at the time of input of the selective final determination by the operator like conventional means but learns and stores at the time of input of a learning instruction. Therefore, in the above example, by inputting the learning instruction at the time of execution of, e.g., printing or storage after editing following the selective final determination, the edited character string data can be learned. Consequently, editing after the selective final determination (e.g., deletion/addition of a character) can be reflected in a character string that is displayed as a candidate in the next conversion. Therefore, the above-explained inconvenience that the operator must perform the same editing in the next conversion can be eliminated, and an operation burden can be reduced, thereby improving convenience.

BRIEF DESCRIPTION OF THE DRAWING

FIG. 5A to 5E are views showing an example of display in a display part when creating an English text.

FIG. 6A to 6C are views showing another example of display in the display part when creating an English text.

FIG. 11A to 11C are views showing still another example of display in the display part when creating a text without using a dictionary.

DETAILED DESCRIPTION OF THE PREFERRED EMBODIMENTS

An embodiment of the present disclosure will now be explained hereinafter with reference to the drawings.

Figure 1:
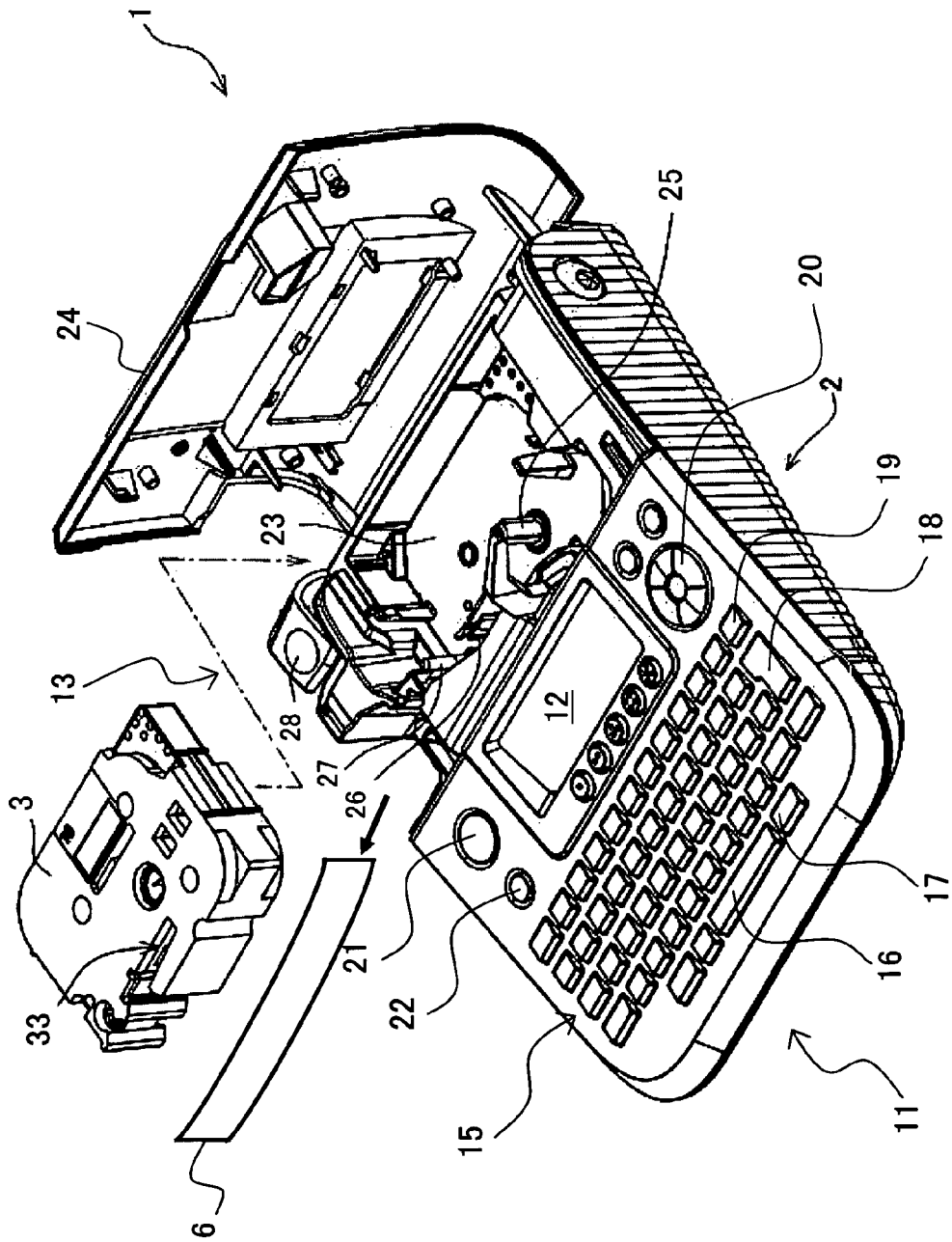
FIG. 1 is a perspective view showing an appearance structure of a tape printing apparatus including a text editing apparatus according to the first embodiment of the present disclosure.

As shown in FIG. 1, the tape printing apparatus 1 according to the first embodiment of the present disclosure has an apparatus main body 2 and a tape cassette 3, and creates a character string printed tape as a sticker or a label that is attached to a utilization target and is used in this state. That is, a text for printing formed of an arbitrary character string is created by an operation from a user. Then, this text is printed on a printing tape 4 (see FIG. 2) to create a printed tape 5 (see FIG. 2). Then, the printed tape 5 is cut off from the printing tape to create a character string printed tape 6. It is to be noted that "character" in "character string" in this specification means a mark or a graphic symbol as well as a character in a general sense.

The apparatus main body 2 includes an operation part 11, a display part 12, and a printing part 13. The operation part 11 is formed into a structure conforming to a general keyboard in the illustrated example. Specifically, in the operation part 11 are provided a character key group 15 including various kinds of keys that are used to input characters (e.g., Japanese syllabary characters or alphabets) or numbers, a space key 16 that is used to insert a space in a text in process of creation, a conversion key 17 that is used to display conversion candidates of a character string input by an operator through the character key group 15, an enter key 18 that is used to finally determine a character string selected from the conversion candidates displayed by the conversion key 17 as a converted character string, a deletion key 19 that is used to delete, e.g., a character during editing of a text in process of creation, a cursor key 20 that is used for an operation of moving a cursor in the display part 12, a print key 21 that is used to input a printing instruction, and a save key 22 that is used to input a storage instruction for a text.

The display part 12 is formed of, e.g., a liquid crystal display, and performs display of an input character string as a character string that is input by an operator through the operation part 11 for text creation, display of conversion candidates required to convert the input character string into a desired converted character string, display of a converted character string that the operator selects from the displayed conversion candidates and finally determines, and others.

In the printing part 13, a cassette attachment part 23 is provided, a printing part cover 24 that covers the cassette attachment part 23 is provided so as to be openable/closable, and the tape cassette 13 can be attached to the cassette attachment part 23 in a state where the printing part cover 24 is opened. Further, in the printing part 3, a ribbon take-up spool driving shaft 25, a thermal head 26, a tape feeding roller driving shaft 27, and others are provided as main printing mechanism elements along the cassette attachment part 23. Using these printing mechanism elements enables performing printing on the printing tape 4 while pulling out the printing tape 4 from the tape cassette 3. Furthermore, a cutter level 28 is provided in the printing part 13, and operating this cutter lever 28 enables cutting off the printed tape 5 from the printing tape 4 to provide the character string printed tape 6.

Figure 2:
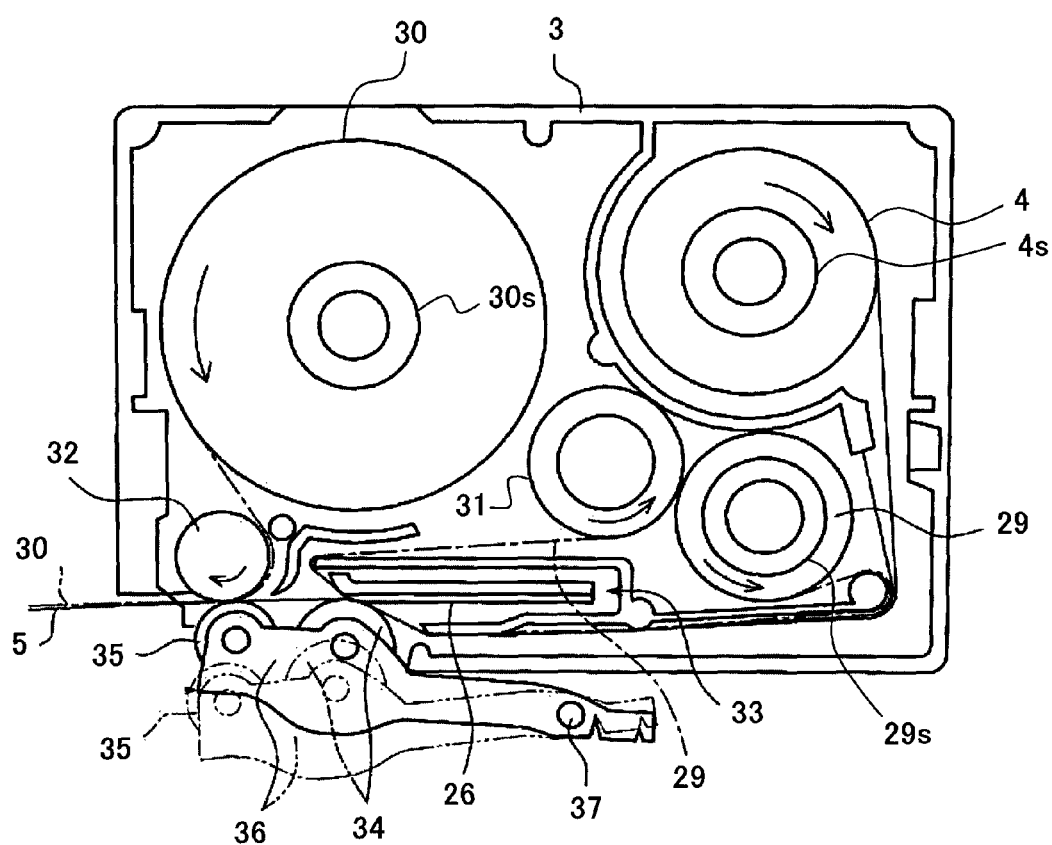
FIG. 2 is a conceptual top view showing an outline of a structure of a tape cassette.

As shown in FIG. 2, the printing tape 4 as a long printing medium formed by using a transparent film, an ink ribbon 29 used for printing on the printing tape 4, and a double-stick tape 30 that is attached to a back surface of the printed tape 5 produced by performing printing on the printing tape 4 are provided in the tape cassette 3 in a state where these members are wound around supply spools 4s, 29s, and 30s in the form of rolls, respectively. Moreover, a used ribbon take-up spool 31 that takes up the used ink ribbon 29 is provided. Additionally, a tape feeding roller 32 that feeds the printed tape 5 toward the outside of the tape cassette 3 and puts the double-stick tape 30 onto the back surface of the printed tape 5 is provided.

When such a tape cassette 3 is attached to the cassette attachment part 23 in the printing part 13 of the apparatus main body 2, the ribbon take-up spool driving shaft 25 of the cassette attachment part 23 is coupled with the used ribbon take-up spool 31. Further, the tape feeding roller driving shaft 27 of the cassette attachment part 23 is coupled with the tape feeding roller 32, and the thermal head 26 of the printing part 13 enters an opening part 33. Furthermore, in printing, the ribbon take-up spool driving shaft 25 and the tape feeding roller driving shaft 27 are synchronously rotated by a non-illustrated driving source, e.g., a motor, thereby synchronously rotating the ribbon take-up spool 31 and the tape feeding roller 32.

As a result, the printing tape 4 and the ink ribbon 29 are pulled out from the respective supply spools 4s and 29s, superimposed on each other, and fed to the thermal head 26. Moreover, a text as a printing target is printed with the thermal head 26 pressed by a platen roller 34. Based on this printing, the printed tape 5 is carried and supplied to the outside by the tape feeding roller 32 while putting the double-stick tape 30 pulled out from the supply spool 30s by the tape feeding roller 32 thereon by a pressure roller 35. Additionally, when an operator operates the cutter level 28 upon completion of necessary printing, the printed tape 5 is cut off from the printing tape 4 to form the character string printed tape 6.

At this time, the platen roller 34 and pressure roller 35 are disposed in a roller holder 36. Further, the roller holder 36 is provided to enable its swiveling motion around a swiveling supporting point 37 and can selectively take a state indicated by a solid line in the drawing (a pressing state where the platen roller 34 and the pressure roller 35 perform necessary pressing) and a non-pressing state indicated by an imaginary line in the drawing.

Figure 3:
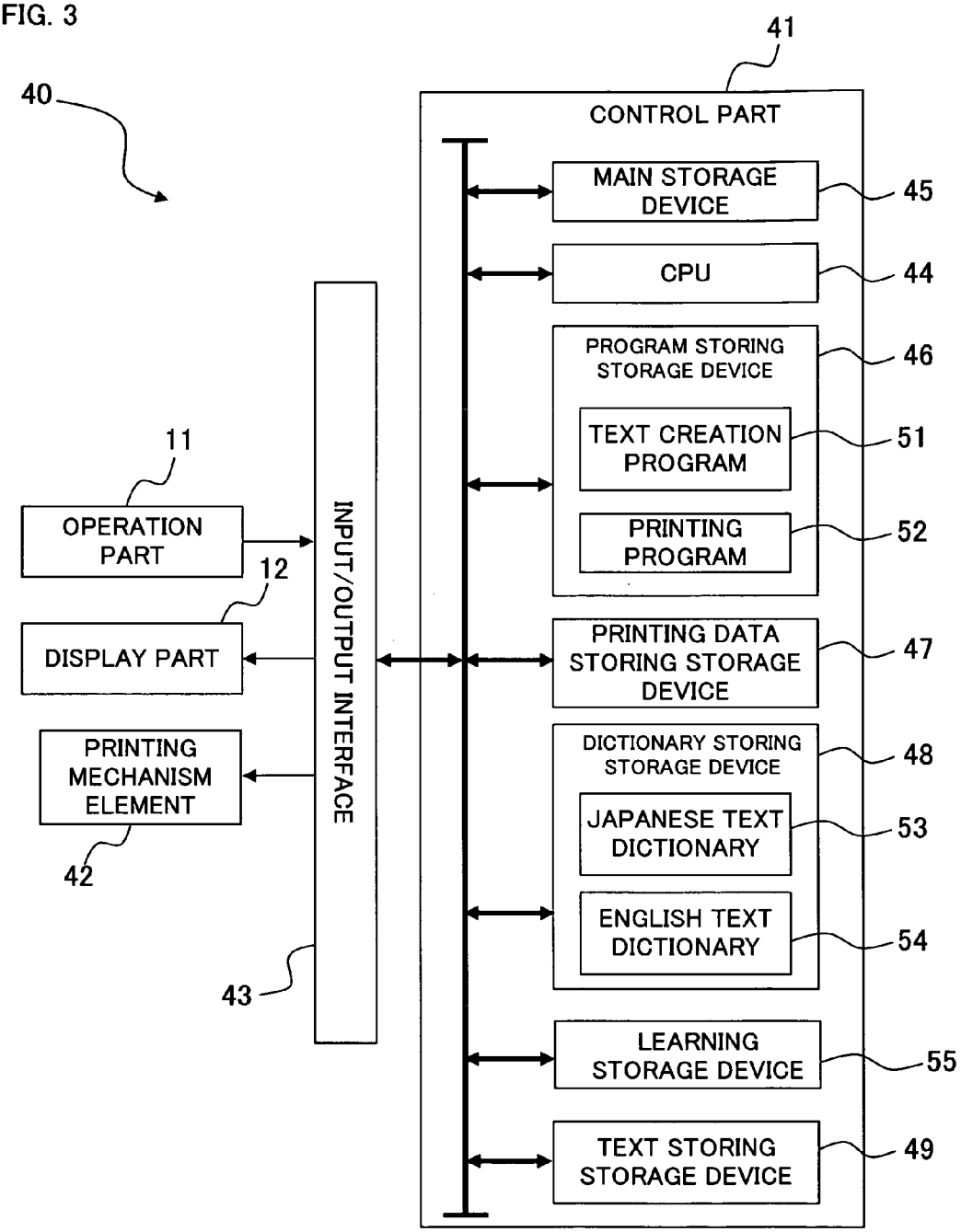
FIG. 3 is a function block diagram showing an example of a structure of a control system provided in the tape printing apparatus.

A control system provided in the tape printing apparatus 1 is shown in FIG. 3. The control system controls an execution of a series of processing from the above-explained creation of a text to creation of the character string printed tape 6.

In a control system 40 depicted in FIG. 3, the operation part 11, the display part 12, and each printing mechanism element 42 are connected with a control part 41 through an input/output interface 43.

The control part 41 has a CPU 44 that performs arithmetic processing for control, a main storage device 45 that temporarily stores a program required for the arithmetic processing in the CPU 44 or temporarily stores an arithmetic processing result obtained by the CPU 44, a program storing storage device 46 that stores various kinds of programs used for control, a printing data storing storage device 47 that stores printing data such as dot pattern data or graphic pattern data, a dictionary storing storage device 48 that stores dictionaries used to create a text, a learning storage device 55 that stores a learning result, and a text storing storage device 49 serving as storage device for saving a created text.

The program storing storage device 46 stores a text creation program (a character conversion processing program for text printing) and a printing program 52.

The dictionary storing storage device 48 stores a publicly known Japanese text dictionary (a language dictionary conversion program. A so-called Chinese character dictionary is included) 53 and an English text dictionary (a language dictionary conversion program) 54 respectively compatible with Japanese texts and English texts (specifically, English texts) in this example. It is to be noted that language dictionary conversion programs for various languages, e.g., German, French, Arabic, Persian, Hebrew, Chinese, or Korean besides Japanese or English may be appropriately stored. Furthermore, when executing such a learning function alone as depicted in later-explained examples in FIGS. 9 to 11 (since dictionaries are not used), this dictionary storing storage device 48 may be eliminated.

Figure 4:
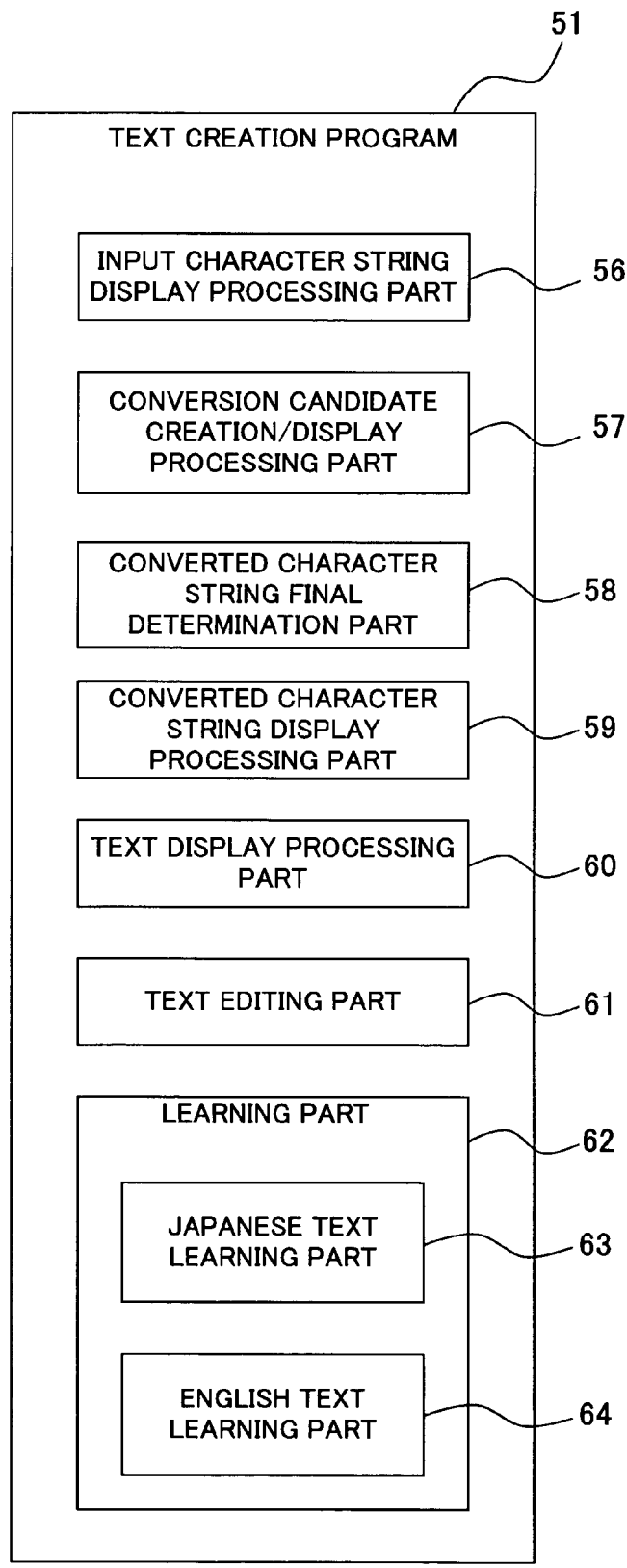
FIG. 4 is a function block diagram showing a functional structure of a text creation program.

As shown in FIG. 4, the text creation program 51 includes an input character display processing part 56 that executes processing for displaying a character string input by an operator through the operation part 11 in the display part 12, a conversion candidate creation/display processing part 57 that executes processing for creating conversion candidates of an input character string displayed in the display part 12 based on retrieval and extraction from the Japanese text dictionary 53 or the English text dictionary 54 and displaying the created conversion candidates in the display part 12, a converted character string final determination part 58 that executes processing for finally determining a conversion candidate selected by the operator from the plurality of conversion candidates displayed in the display part 12 as a converted character string, a converted character string display processing part 59 that executes processing for displaying the finally-determined converted character string in the display part 12, a text display processing part 60 that executes processing for displaying a text formed of the converted character string in the display part 12, a text editing part 61 that executes processing involved in editing of the text displayed in the display part 12 by the operator, and a learning part 62 that executes processing for learning about creation of the text.

The learning part 62 is formed of a Japanese text learning part 63 that is used for learning about creation of a Japanese text and an English text learning part 64 that is used for learning about creation of an English text. Here, each display processing with respect to the display part 12 is also processing involving processing for outputting a signal for display in the display part 12.

Examples of display in the display part 12 in a text creation process using the above-described text creation program 51 will now be explained with reference to FIGS. 5 to 11. Here, three examples, i.e., an example of text creation using the English text dictionary 54, an example of text creation using the Japanese text dictionary 53, and an example of text creation without using dictionaries will be sequentially explained.

It is to be noted that a situation where three screens, i.e., an input character string display screen 66, a conversion candidate display screen 67, and a text display screen 68 are displayed in the display part 12 in parallel will be explained in the following examples, but the present disclosure is not necessarily restricted thereto. For example, respective sets of processing, i.e., input character string display processing, conversion candidate display processing, and text display processing may be executed in one screen, or two sets of processing, i.e., conversion candidate display processing and text display processing alone may be executed in a common screen. When the screen is shared in this manner, each screen can be used in accordance with a flow of processing.

(A) Text Creation using English Text Dictionary (A-1) First Text Creation

An example of creating a text "Conf Ro 10" representing an abbreviation of a 10th conference room is described by using FIGS. 5A to 5E. It is assumed that an operator first inputs "Co" through the character key group 15 in the operation part 11. Consequently, as depicted in FIG. 5A, an input character string "Co" is displayed in the input character string display screen 66.

When the operator operates the conversion key 17 in this state, conversion candidates "Coach", "Conference", and "Connect" for the input character string "Co" are displayed in the conversion candidate display screen 67. Further, selecting and finally determining "Conference" as a converted character string from the conversion candidates by using, e.g., a cursor key 20 enables creating a text formed of the converted character string "Conference", and this text is displayed in the text display screen 68. It is to be noted that the character string is displayed with hatching in the conversion candidate display screen 67, and this means that this character string is selected/finally determined.

Then, since characters "erence" are not required, the operator uses a deletion key 19 to delete "erence". As a result, as shown in FIG. 5B, characters "Conf" alone are displayed in the text display screen 68.

Furthermore, the operator inputs "R" through the character key group 15 in the operation part 11. As a result, as shown in FIG. 5C, an input character string "R" is displayed in the input character string display screen 66.

When the operator operates the conversion key 17 in this state, conversion candidates "Read", "Room", and "Russia" for the input character string "R" are displayed in the conversion candidate display screen 67. Moreover, selecting and finally determining "Room" as a converted character string from these conversion candidate by using, e.g., the cursor key 20 enables creating and adding a text formed of the converted character string "Room". As a result, a text "Conf Room" having "Room" added to the previously created "Conf" is displayed in the text display screen 68.

Then, since characters "om" are not required, the operator uses the deletion key 19 to delete "om". Consequently, as shown in FIG. 5D, characters "Conf Ro" alone are displayed in the text display screen 68.

Additionally, it is assumed that the operator inputs "10" through the character key group 15 in the operation part 11 based on an intention to display the next characters "10". As a result, as shown in FIG. 5E, an input character string "10" is displayed in the input character string display screen 66.

When the operator operates the conversion key 17 in this state (it is assumed that figures are not converted. It is to be noted that any other appropriate key than the conversion key 17 may be used), a text including the character string "10" is created and added. As a result, a text "Conf Ro 10" having "10" added to the previously created character string "Conf Ro" is brought to completion, and this text is displayed in the text display screen 68.

Further, when the print key 21 is operated in this state, the character string printed tape 6 on which "Conf Ro 10" is printed is created. It is to be noted that a learning function is executed by the operation of the print key 21 at this time (which will be explained later in detail), and character string data "C" (or "Co") before the conversion operation in "CoR10" input thus far by the operation of the character key group 15 by the operator is associated with "Conf Ro 10" to be stored.

(A-2) Second Text Creation

An example where a text "Conf Ro 11" representing an 11th conference room is created after the first creation of the text "Conf Ro 10", is described by using FIGS. 6A to 6C show. At this time, the operator inputs "C" (alternatively, "Co" may be input. This can be likewise applied to the following examples) through the character key group 15 in the operation part 11. Consequently, as shown in FIG. 6A, an input character string "C" is displayed in the input character string display screen 66.

When the operator operates the conversion key 17 in this state, since character string data "C" is associated with "Conf Ro 10" by the above-explained learning function, a conversion candidate "ConfRo 10" for the input character string "C" is displayed in the conversion candidate display screen 67. Further, selecting and finally determining this "Conf Ro 10" as a converted character string by using, e.g., the cursor key 20 enables creating a text formed of the converted character string "Conf Ro 10", and this text is displayed in the text display screen 68.

Then, to delete a character "0" and substitute this character by "1", the operator uses the deletion key 19 to delete "0". As a result, as shown in FIG. 6B, characters "Conf Ro 1" alone are displayed in the text display screen 68.

Furthermore, the operator inputs "1" through the character input group 15 in the operation part 11. As a result, as shown in FIG. 6C, an input character string "1" is displayed in the input character string display screen 66.

When the operator operates the conversion key 17 in this state, a text formed of the character string "1" is created and added as it is (since a numeric character is not converted). Consequently, a text "Conf Ro 11" in which "1" is added to the previously created "Conf Ro 1" is brought to completion, and this text is displayed in the text display screen 68.

Moreover, when the print key 21 is operated in this state, the character string printed tape 6 on which "Conf Ro 11" is printed is created. It is to be noted that the characters string data "C" (or "Co") is stored in association with "Conf Ro 11" by the operation of the print key 21 at this moment like the above example.

(B) Text Creation using Japanese Text Dictionary (B-1) First Text Creation

Figure 7A:
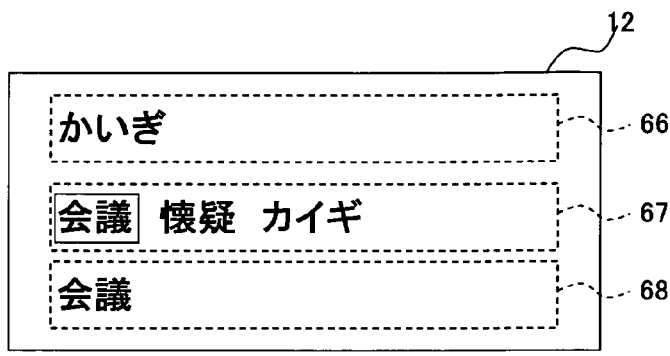
FIGS. 7A to 7E are views showing an example of display in the display part when creating a Japanese text.

An example of creating a text "Kaibi 2 (会備2)" representing a second equipment in a conference room, is described by using FIGS. 7A to 7E. It is assumed that the operator first inputs "Kaigi (かいぎ)" through the character key group 15 in the operation part 11 based on an intention to readily display a character "Kai (会)". Consequently, as shown in FIG. 7A, an input character string "Kaigi (かいぎ)" is displayed in the input character string display screen 66.

When the operator operators the conversion key 17 in this state, conversion candidates "Kaigi (会議)", "Kaigi (懐疑)", and "Kaigi (カイギ)" for the input character string "Kaigi (かい)" are displayed in the conversion candidate display screen 67. Moreover, selecting and finally determining "Kaigi (会議)" as a converted character string from these conversion candidates by using, e.g., the cursor key 20 enables creating a text formed of the converted character string "Kaigi (会議)", and this text is displayed in the text display screen 68. It is to be noted that the character string is displayed with hatching in the conversion candidate display screen 67 and this means that this character string is selected/finally determined.

Figure 7B:
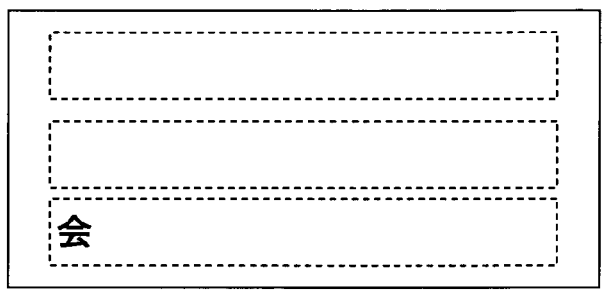

Thereafter, since a character "Gi (議)" is not required, the operator uses the deletion key 19 to delete "Gi (議)". Consequently, as shown in FIG. 7B, a character "Kai (会)" alone is displayed in the text display screen 68.

Figure 7C:
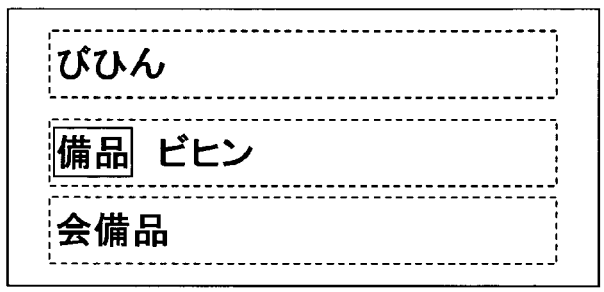

Additionally, it is assumed that the operator inputs "Bihin (びひん)" through the character key group 15 in the operation part 11 based on an intention to readily display the next character "Bi (備)". As a result, as shown in FIG. 7C, a character string "Bihin (びひん)" is displayed in the input character string display screen 66.

When the operator operates the conversion key 17 in this state, conversion candidates "Bihin (備品)" and "Bihin (ビヒン)" for the input character string "Bihin (びひん)" are displayed in the conversion candidate display screen 67. Further, selecting and finally determining "Bihin (備品)" as a converted character string from these conversion candidates by using, e.g., the cursor key 20 enables creating and adding a text formed of the converted character string "Bihin (備品)". As a result, a text "Kaibihin (会備品)" in which "Bihin (備品)" is added to the previously created "Kai (会)" is displayed in the text display screen 68.

Figure 7D:
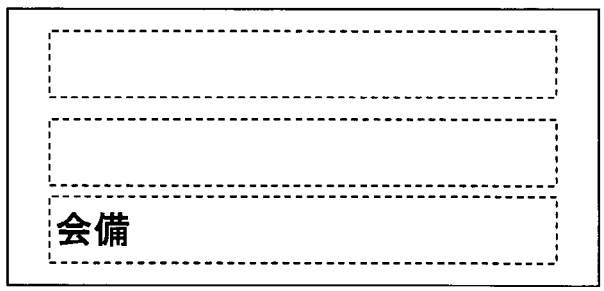

Subsequently, since a character "Hin (品)" is not required, the operator uses the deletion key 19 to delete "Hin (品)". Consequently, as shown in FIG. 7D, characters "Kaibi (会備)" alone are displayed in the text display screen 68.

Figure 7E:
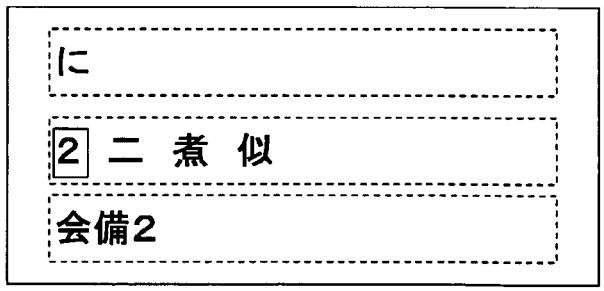

Furthermore, it is assumed that the operator inputs "Ni (に)" through the character key group 15 in the operation part 11 based on an intention to display the next character "2". Consequently, an input character string "Ni (に)" is displayed in the input character string display screen 66 as shown in FIG. 7E.

When the operator operates the conversion key 17 in this state, conversion candidates "2", "Ni (二)", "Ni (煮)", and "Ni (似)" for the input character string "Ni (に)" are displayed in the conversion candidate display screen 67. Moreover, selecting and finally determining "2" as a converted character string from these conversion candidates by using, e.g., the cursor key 20 enables creating and adding a text formed of the converted character string "2". As a result, a text "Kaibi 2 (会備)" in which "2" is added to the previously created text "Kaibi (会備)" is brought to completion, and this text is displayed in the text display screen 68.

Additionally, when the print key 21 is operated in this state, the character string printed tape 6 on which "Kaibi 2 (会備)" is printed is created. It is to be noted that the learning function is executed by the operation of the print key 21 at this moment (which will be explained later in detail), and character string data "Ka (か)" (or "Kai (かい)") before the conversion operation in "Kaigibihinni (かいぎびひんに)" input thus far by operating the character key group 15 by the operator is associated with "Kaibini (会備)" to be stored.

(B-2) Second Text Creation

Figure 8A:
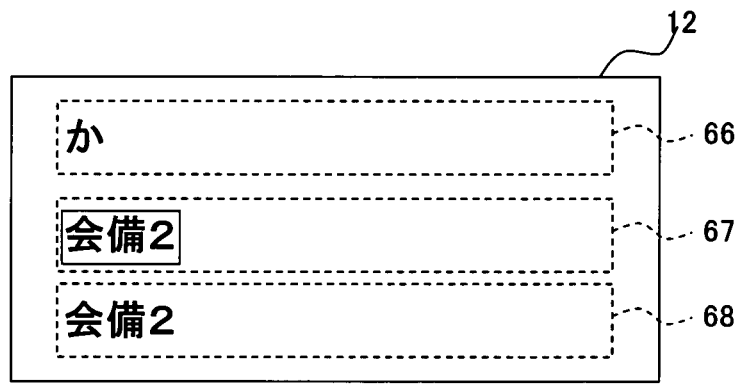
FIG. 8A to 8C are views showing another example of display in the display part when creating a Japanese text.
Figure 8B:
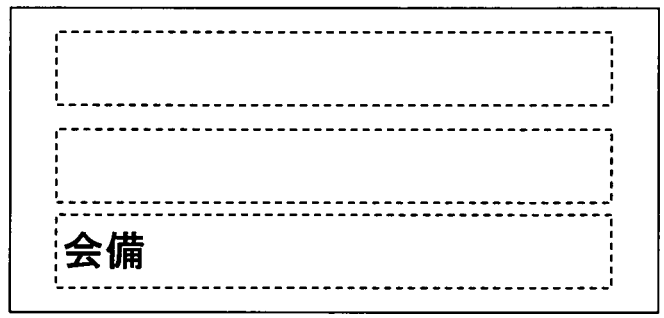
Figure 8C:
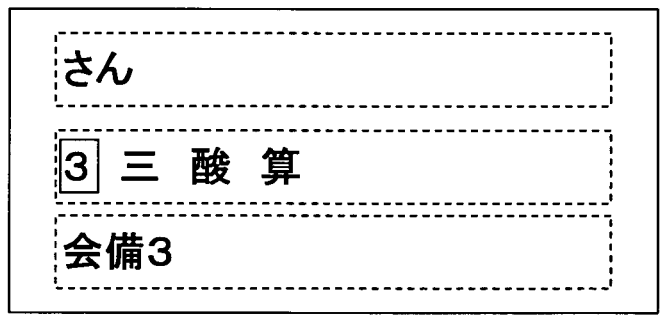

An example of creating a text "Kaibi 3 (会備)" representing a third equipment in the conference room after the first creation of the text "Kaibi 2 (会備)", is described by using FIGS. 8A to 8C. At this time, the operator inputs "Ka (か)" (alternatively, "Kai (かい)" may be input. This can be likewise applied to the following examples) through the character key group 15 in the operation part 11. As a result, an input character string "Ka (か)" is displayed in the input character string display screen 66 as depicted in FIG. 8A.

When the operator operates the conversion key 17 in this state, since the character string data "Ka (か)" is associated with "Kaibi 2 (会備 2)" by the above-explained learning function, a conversion candidate "Kaibi 2 (会備 2)" for the input character string "Ka (か)" is displayed in the conversion candidate display screen 67. Further, selecting and finally determining this "Kaibi 2 (会備)" as a converted character string by using, e.g., the cursor key 20 enables creating a text formed of the converted character string "Kaibi 2 (会備 2)", and this text is displayed in the text display screen 68.

Then, the operator uses the deletion key 19 to delete "2" with an intention to delete a character "2" and substitute the same by "3". As a result, characters "Kaibi (会備)" alone are displayed in the text display screen 68 as shown in FIG. 8B.

Furthermore, it is assumed that the operator inputs "San ( さん )" through the character key group 15 in the operation part 11 based on an intention to display the next character "3". Consequently, as shown in FIG. 8C, an input character string "San (さん)" is displayed in the input character string display screen 66.

When the operator operates the conversion key 17 in this state, conversion candidates "2", "San (三)", "San (酸)", and "San (算)" for the input character string "San (さん)" are displayed in the conversion candidate display screen 67. Moreover, selecting and finally determining "3" as a converted character string from these conversion candidates by using, e.g., the cursor key 20 enable creating and adding a text formed of the converted character string "3". Consequently, a text "Kaibi 3 (会備 3)" in which "3" is added to the previously created text "Kaibi (会備)" is brought to completion, and this text is displayed in the text display screen 68.

Additionally, when the print key 21 is operated in this state, the character string printed tape 6 on which "Kaibi 3 (会備)" is printed is created. It is to be noted that the character string data "Ka (か)" (or "Kai (かい)") is associated with "Kaibi 3 (会備 3)" to be stored by the operation of the print key 21 at this moment like the above example.

(C) Text Creation without using Dictionary (C-1) First Text Creation

Figure 9A:
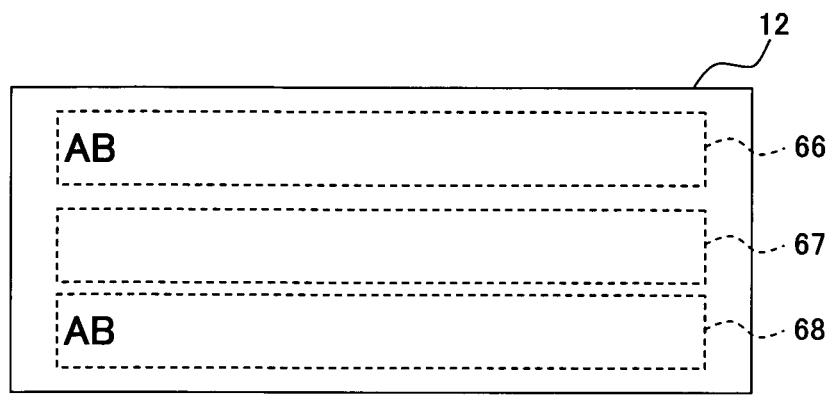
FIG. 9A to 9B are views showing an example of display in the display part when creating a text without using a dictionary.
Figure 9B:
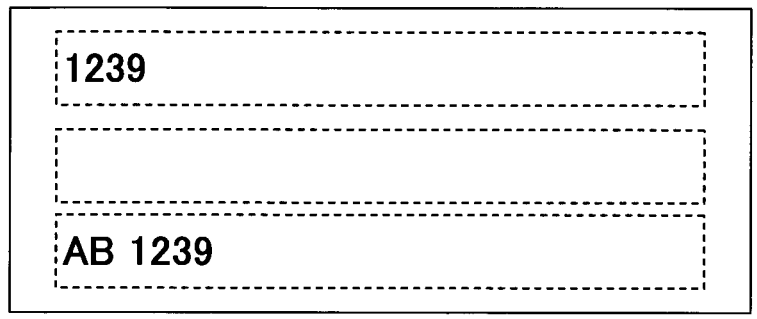

An example where a text "AB 1239" representing, e.g., a management number for a commodity is created, is described by using FIGS. 9A to 9B. It is assumed that the operator first inputs "AB" through the character key group 15 in the operation part 11. As a result, an input character string "AB" is displayed in the input character string display screen 66 as shown in FIG. 9A.

Since a dictionary is not used in this example (the dictionary storing storage device 48 is not provided, for example), when the operator operates the conversion key 17 in this state, a text formed of the character string "AB" is created (because conversion storage data is not stored in the learning storage device 55 at this point in time), and this text is displayed in the text display screen 68.

Then, the operator inputs "1239" through the character key group 15 in the operation part 11. As a result, an input character string "1239" is displayed in the input character string display screen 66 as shown in FIG. 9B.

When the operator operates the conversion key 17 in this state, a text formed of the character string "1239" is created and added as it is like the above example. Consequently, a text "AB 1239" in which "1239" is added to the previously created "AB" is displayed in the text display screen 68.

Further, operating the print key 21 in this state enables creating the character string printed tape 6 on which "AB 1239" is printed. It is to be noted that the learning function is executed by the operation of the print key 21 at this moment (which will be explained later in detail), and character string data "A" (or "AB") in "AB1239" input thus far by operating the character key group 15 by the operator is associated with "AB 1239" to be stored.

(C-2) Second Text Creation

Figure 10A:
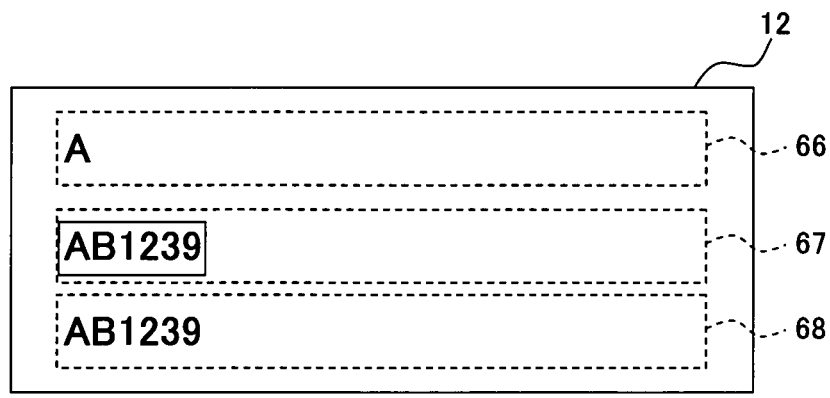
FIG. 10A to 10C are views showing another example of display in the display part when creating a text without using a dictionary.
Figure 10B:
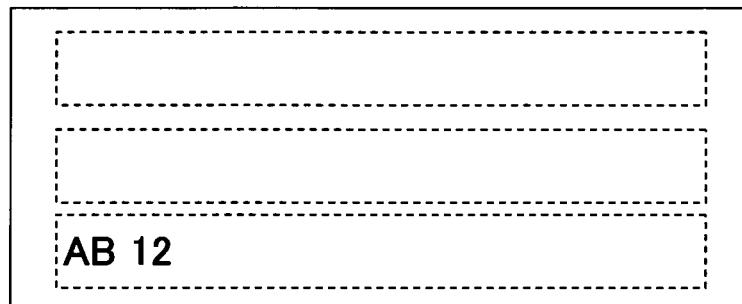
Figure 10C:
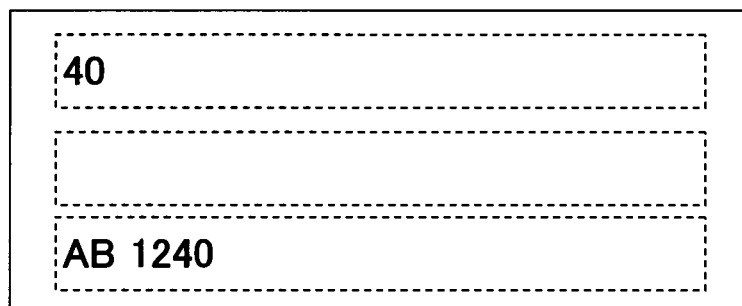

An example where a text "AB 1240" having a partially changed number is created after the first creation of the text "AB 1239", is described by using FIGS. 10A to 10C. At this time, the operator inputs "A" (alternatively, "AB" may be input. This can be likewise applied to the following examples) through the character key group 15 in the operation part 11. As a result, an input character string "A" is displayed in the input character string display screen 66 as shown in FIG. 10A.

When the operator operates the conversion key 17 in this state, since character string data "A" is associated with "AB 1239" by the above-explained learning function, a conversion candidate "AB 1239" for the input character string "A" is displayed in the conversion candidate screen 67. Furthermore, selecting and finally determining this "AB 1239" as a converted character string by using, e.g., the cursor key 20 enable creating a text formed of the converted character string "AB 1239", and this text is displayed in the text display screen 68.

Then, the operator uses the deletion key 19 to delete "39" with an intention to delete a character "39" and substitute it by "40". With this operation, characters "AB 12" alone are displayed in the text display screen 68 as shown in FIG. 10B.

Moreover, the operator inputs "40" through the character key group 15 in the operation part 11. As a result, an input character string "40" is displayed in the input character string display screen 66 as shown in FIG. 10C.

When the operator operates the conversion key 17 in this state, a text formed of the character string "40" is created and added as it is. Consequently, a text "AB 1240" in which "40" is added to the previously created "AB 12" is brought to completion, and this text is displayed in the text display screen 68.

Additionally, operating the print key 21 in this state enables creating the character string printed tape 6 on which "AB 1240" is printed. It is to be noted that character string data "A" (or "AB") before the conversion operation is newly associated with "AB 1240" to be stored by the operation of the print key 21 at this moment like the above example.

(C-3) Third Text Creation

An example where a text "AB 1241" having a partially changed number is created after the second creation of the text "AB 1240", is described by using FIGS. 11A to 11C. At this time, the operator inputs "A" (alternatively, "AB" may be input. This can be likewise applied to the following examples) through the character key group 15 in the operation part 11. Consequently, an input character string "A" is displayed in the input character string display screen 66 as shown in FIG. 11A.

When the operator operates the conversion key 17 in this state, conversion candidates "AB 1240" and "AB 1239" for the input character string "A" are displayed in the conversion candidate display screen 67 since the character string data "A" is associated with "AB 1239" in the first text creation and the character string data "A" is associated with "AB 1240" in the second text creation. Further, selecting and finally determining "AB 1240" (having less difference) as a converted character string by using, e.g., the cursor key 20 enable creating a text formed of the converted character string "AB 1240", and this text is displayed in the text display screen 68.

Thereafter, to delete a character "0" and substitute it by "1", the operator uses the deletion key 19 to delete "0". As a result, characters "AB 124" alone are displayed in the text display screen 68 as shown in FIG. 11B.

Furthermore, the operator inputs "1" through the character key group 15 in the operation part 11. Consequently, as shown in FIG. 11C, an input character string "1" is displayed in the input character string display screen 66.

When the operator operates the conversion key 17 in this state, a text formed of the character string "1" is created and added as it is. As a result, a text "AB 1241" in which "1" is added to the previously created "AB 124" is brought to completion, and this text is displayed in the text display screen 68.

Moreover, operating the print key 21 in this state enables creating the character string printed tape 6 on which "AB 1241" is printed. It is to be noted that the character string data "A" (or "AB") before the conversion operation is newly associated with "AB 1241" to be stored by the operation of the print key 21 at this moment like the above example.

Figure 12:
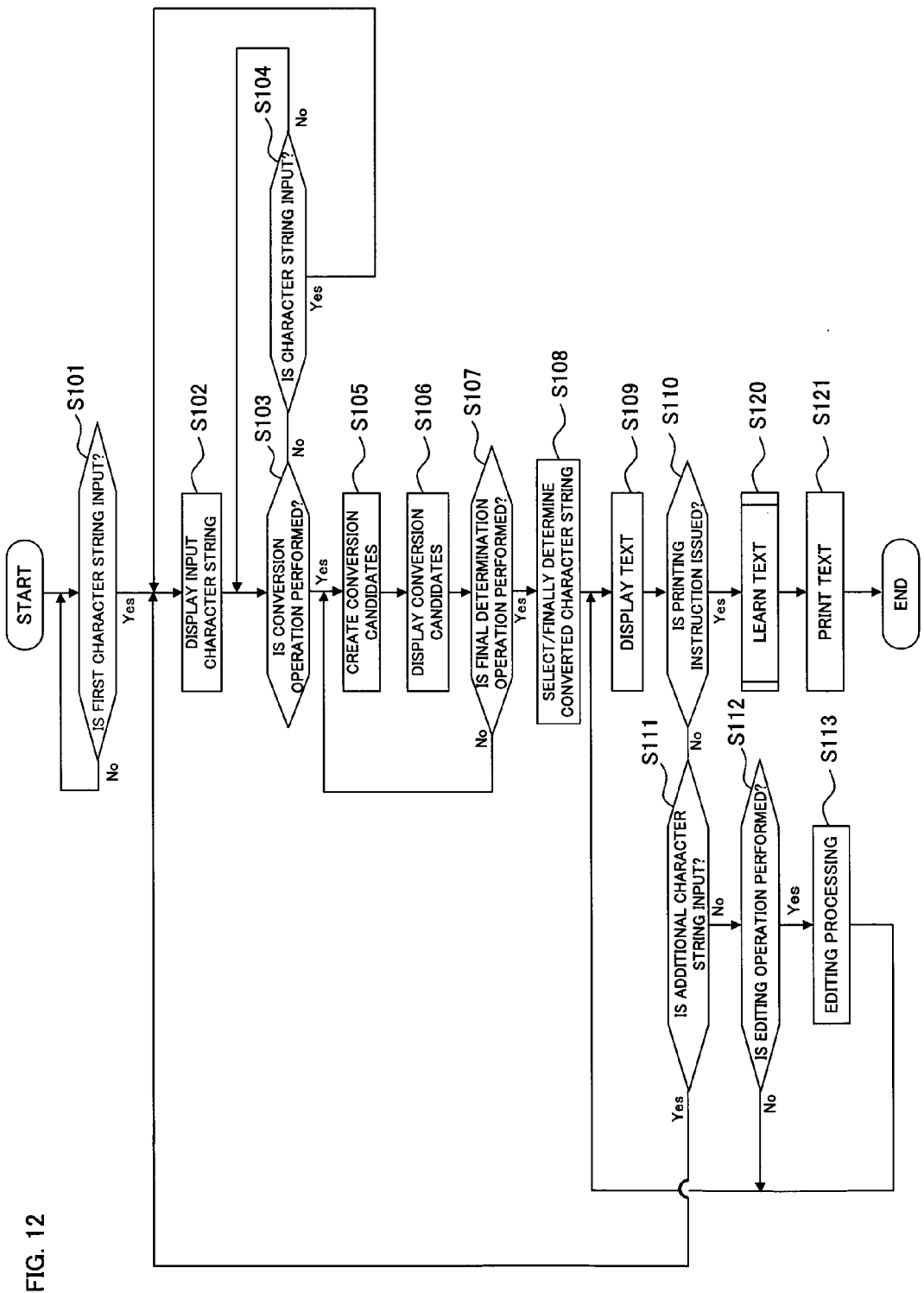
FIG. 12 is a flowchart showing a control processing procedure in text creation processing.

In order to carry out the above-explained text creation method (the character conversion processing method for text printing), the text creation processing shown in FIG. 12 is executed by the control part 41 based on the text creation program 51.

In FIG. 12, first, at a step S101, a judgment is made upon whether a first character string is input by the operator through the operation part 11. When any character string is input, the judgment is met, and the control proceeds to a step S102.

At a step S102, a signal required to display the input character string input at the step S101 is output to the display part 12, and the character string is displayed in the input character string display screen 66 in the display part 12 as shown in FIGS. 5A, 7A, 9A, and others.

Then, at a step S103, a judgment is made upon whether the operator performs the conversion operation through the conversion key 17 in the operation part 11.

When the conversion operation is not performed, the judgment at the step S103 is not satisfied, and the control proceeds to a step S104. At the step S104, whether another character string is input by the operator through the operation part 11 is judged like the step S101. When no character string is input, the control returns to the step S103 to repeat the same procedure from the judgment on the conversion operation. When any character string is input, the judgment at the step S104 is satisfied, and the control returns to the step S102 to repeat the same procedure.

On the other hand, when the conversion operation is performed by the operator at the step S103, the judgment is satisfied, and the control proceeds to a step S105. At the step S105, conversion candidates for the input character string input thus far and displayed at the step S102 are created. Creation of conversion candidates is executed by a function of the conversion candidate creation/display processing part 57 provided in the text creation program 51 in the program storing storage device 46 based on the Japanese text dictionary 53 or the English text dictionary 54 in the dictionary storing storage device 48. Further, if the learning storage device 55 has a learning result therein, this result is used to execute this creation.

Thereafter, at a step S106, a signal required to display the conversion candidates created at the step S105 is output to the display part 12 to display the conversion candidates in the conversion candidate display screen 67 in the display part 12 as shown in FIGS. 5A, 7A, and others. It is to be noted that the conversion candidates may be displayed based on a scheme of displaying conversion candidates in the form of a list as long as possible or a scheme of sequentially displaying respective conversion candidates by an operation of, e.g., the conversion key 17.

Moreover, the control proceeds to a step S107, a judgment is made upon whether a final determination operation (e.g., an operation of the enter key 18 in a state where a conversion candidate to be selected is specified by a cursor) is performed with respect to the conversion candidates displayed at the step S106 through the operation part 11. The control returns to the step S105 to repeat the procedure of creation and display of the conversion candidates until the final determination operation is carried out. When the final determination operation is effected, the judgment at the step S107 is satisfied, and the control proceeds to a step S108.

At the step S108, a converted character string is selected and finally determined from corresponding conversion candidates in accordance with the final determination operation. This selection/final determination of the converted character string enables creating a text formed of this finally-determined converted character string.

Additionally, the control proceeds to a step S109, a signal required to display the text finally determined and created at the step S108 is output to the display part 12, and this text is displayed in the text display screen 68 in the display part 12 as shown in FIGS. 5A, 7A, and others.

Subsequently, the control proceeds to a step S110, and a judgment is made upon whether a printing instruction (an operation of the print key 21) is issued through the operation part 11. When the printing instruction is not issued, the control proceeds to a step S111, and whether another character string is input by the operator through the operation part 11 is judged like the step S104. When any character string is input, the judgment at the step S111 is satisfied, and the control returns to the step S102 to repeat the same procedure. When a character string is not input, the control proceeds to a step S112.

At a step S112, a judgment is made upon whether an editing operation (deletion of a character in the text by using the deletion key 19 in this example) is performed by the operator through the operation part 11 with respect to the text finally determined at the step S108 and displayed at the step S109.

When the editing operation is not performed, the judgment at the step S112 is not satisfied, and the control returns to the step S110 to repeat the same procedure from a standby mode for a printing instruction. When the editing operation is performed, the judgment at the step S112 is satisfied, and the control proceeds to a step S113 to carry out corresponding editing processing (although a detailed explanation will be omitted, a character is deleted to create a new character string, and corresponding display is executed) and then returns to text display at the step S109.

On the other hand, when the printing instruction (the operation of the print key 21) is issued through the operation part 11 at the step S110, the judgment is satisfied, and the control proceeds to a step S120.

At the step S120, learning processing for associating the input character string input by the operator through the operation part 11 before creation of conversion candidates at the step S105 (i.e., at the step S101 or the step S104) with the text to be printed based on the instruction at the step S110 (i.e., the character string data displayed at the step S109) to be stored in the learning storage device 55 is executed. Learning at this step S120 is learning performed in relation to creation of a text, i.e., text creation learning, and it is executed by using a function of the learning part 62 (which is specifically the Japanese text learning part 63 or the English text learning part 64) provided in the text creation program 51 in the program storing storage device 46.

It is to be noted that processing for creating a shortened input character string formed of approximately one character or two characters may be performed based on a predetermined rule when the character string input before conversion is relatively long, and this generated shortened character string may be associated with the character string data displayed at the step S109 to perform the learning processing.

Further, the present disclosure is not restricted to the learning processing for associating the input character string at the first step S101 or the step S104 with the character string data displayed at the step S109 as explained above. That is, it is also possible to perform learning processing for associating all input character strings (before conversion) at the step S101 or the step S104 up to a printing operation including an input character string (before conversion) at the step S104 when the control returns to the step S102 from the step S111 based on input of an added character string after finally determining a character string at the step S108 with the character string data displayed at the step S109. In this case, when generating the shortened character string in the above-explained manner, providing an order according to a base input order of input characters can suffice. Furthermore, messages "may (a given shortened character string) be associated with "(a certain input character)" to be learned?" and "may (the next shortened character string) be associated with "(a certain input character)" to be learned?" can be displayed in the form of a list or alternately displayed before the learning processing in accordance with this order to allow the operator to make a selection.

After end of the learning processing at the step S120, a control signal or the like required to print the text edited at the step S113 (finally determined at or before the step S109) is output to the printing mechanism element 42 at the step S121 to terminate this flow.

As explained above, in this embodiment, a scheme where learning is performed when a converted character string is finally determined from conversion candidates for an input character string (learning upon final determination) is not adopted, but learning is carried out when a printing instruction is issued from the print key 21 after finally determining a converted character string (the step S120 in FIG. 12). For example, in case of learning upon final determination, when the operator performs, e.g., input of character string data (corresponding to the step S101 or the step S104 in FIG. 12), display of conversion candidates (corresponding to the step S106), selective final determination (corresponding to the step S108), editing a finally-determined character string (e.g., deletion or addition of a character. This corresponds to the step S113), and execution of printing (corresponding to the step S121) are executed in the mentioned order, editing after the selective final determination (e.g., deletion or addition of a character) is not reflected in candidates displayed in the next conversion (because learning is effected at the time point corresponding to the step S108). Therefore, even when printing the same text again is desired (including a case where printing a slightly changed text is desired), the operator must perform editing again in the same procedure with respect to displayed candidates from the beginning, which is inconvenient.

On the other hand, in the foregoing embodiment, when the operator inputs a printing instruction (the step S110), character string data displayed in the display part 12 at this moment (see the step S109) is learned and stored (the step S120). That is, character input ("C" or "Co" in the example depicted in FIG. 5) performed by the operator before creating conversion candidates is not associated with character string data at the time of selective final determination ("Conference Room 10" in the above example), but associated with character string data at the time of printing instruction input ("Conf Ro 10" in the above example) to be learned and stored.

Therefore, in the next text creation, editing after the selective final determination (deletion/addition of a character) can be reflected in candidates displayed at the time of conversion ("Conf Ro 10" is displayed as a candidate with respect to input of "C" or "Co" in the example of FIG. 6 corresponding to the above example). Therefore, an inconvenience that the operator must perform the same editing again in the next conversion can be eliminated, thereby reducing an operation burden and improving convenience.

In particular, since a character amount of a text to be created is limited and the same or similar texts are repeatedly created in the tape printing apparatus 1, the above-explained learning scheme upon a printing instruction is considerably highly effective. Further, when a use application is, e.g., a label, since editing for abbreviating a converted character string in a text during a creation process is often carried out, effectiveness of the learning scheme upon a printing instruction is increased.

It is to be noted that the present disclosure is not restricted to the foregoing embodiment and can be modified in many ways without departing from the purpose and the technical scope of the present disclosure. Such modifications will now be explained hereinafter in sequence.

(1) When Storage Processing is performed without Printing

That is, in the foregoing embodiment, learning is carried out when a printing instruction is input as a learning timing substituting for learning upon final determination where learning is performed when a converted character string is finally determined from conversion candidates for an input character string on the assumption that an operator must necessarily print a text. In this modification, learning is effected when a text is temporarily subjected to storage processing (when a text is stored and saved in the text storing storage device 49 in this example) on the assumption that the text is not (immediately) printed.

Figure 13:
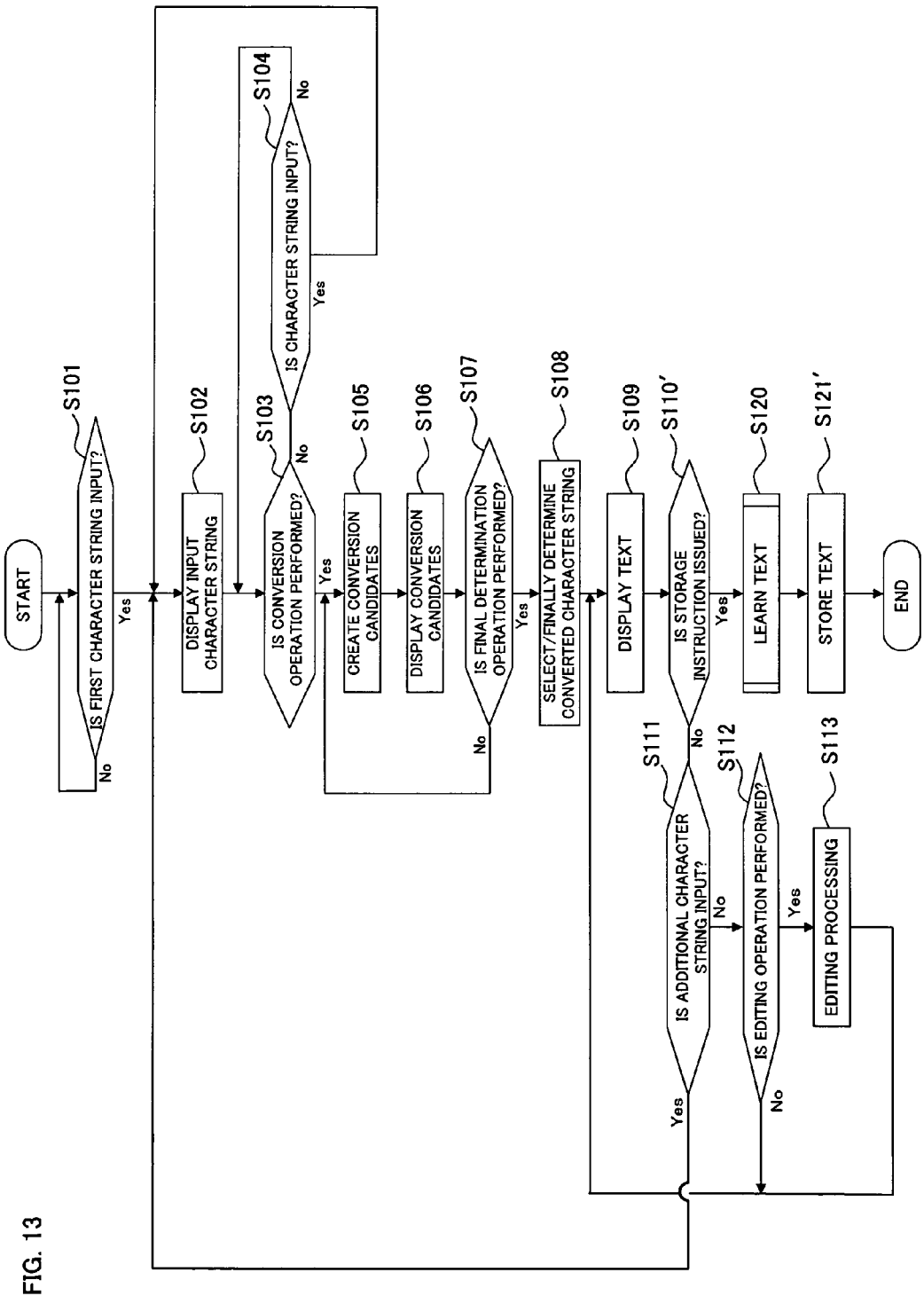
FIG. 13 is a flowchart showing a procedure of processing according to a modification of performing storage processing, and associated with FIG. 12.

The text creation processing shown in FIG. 13 is executed by a control part 41 according to this modification. In the FIG. 13, like reference numerals denote procedures equal to those in FIG. 12.

In the flow depicted in FIG. 13, a step S110' is provided in place of the step S110 and a step S121' is provided instead of the step S121 to cope with avoidance of printing mentioned above.

That is, when the step S109 is finished, at the Step 110', a judgment is made upon whether a storage instruction (an appropriate operation for storage in the text storing storage device 49) is issued through the operation part 11.

If the storage instruction is not issued, the judgment at the step S110' is not satisfied, and the control proceeds to the step S111, and the same processing is then performed like the foregoing embodiment.

When the storage instruction is issued, the judgment at the step S110' is satisfied, and learning processing is executed at the same step S110 as that explained above. Subsequently, at the step S121', a text is stored in the text storing storage device 49, and this flow is terminated.

This modification can obtain substantially the same effect as that in the foregoing embodiment. That is, when the operator inputs a text storage instruction (the step S110'), character string data displayed in the display part 12 at this moment (see step S109) is learned and stored (the step S120). That is, character input performed by the operator before creating conversion candidates is learned and stored in association with the character string data obtained at the time of input of the storage instruction. Therefore, editing (deletion/addition of a character) after the selective final determination can be reflected in candidates displayed at the time of conversion in the next text creation, thereby reducing an operation burden and improving convenience.

(2) When Mode Switching is Performed

That is, this enables selecting and using the learning scheme upon input of a printing instruction like the foregoing embodiment (or the learning scheme upon input of a storage instruction like the modification (1)) or the regular learning scheme upon final determination. Although a detailed explanation will be omitted, for example, two modes (a first mode associated with learning upon, e.g., input of a printing instruction and a second mode associated with learning upon final determination) are provided in accordance with these learning schemes, and switching the two modes by operating a mode changeover switch appropriately arranged in the operation part 11 can suffice.

This modification enables selecting learning and storing character input performed by the operator before creating conversion candidates in association with character string data at the time of, e.g., input of a printing instruction or learning and storing the same in association with character string data at the time of input of a selective final determination. As a result, the learning scheme can be selectively utilized based on an advantage for the user, thus further improving convenience.

Moreover, for example, the foregoing embodiment or the modifications correspond to the example where the text editing apparatus is the tape printing apparatus and this tape printing apparatus includes the operation part or the display part, but the present disclosure is not restricted thereto. For example, the present disclosure can be likewise applied to a tape printing apparatus that is connected with a personal computer to be used and allows this personal computer to function as an operation part or a display part. Additionally, the present disclosure can be likewise applied to text editing apparatuses other than the tape printing apparatus.

Further, besides the above explanation, techniques based on the foregoing embodiment or each modification may be appropriately combined to be utilized.

Besides; although not exemplified, the present disclosure is modified in many ways to be carried out without departing from the scope of the disclosure.

What is claimed is:

1. A printing apparatus comprising:
an apparatus main body;
a cassette attachment part that a tape cassette is attached to and is disposed inside said apparatus main body;
a cover that covers said cassette attachment part and is disposed at said apparatus main body so as to be openable/closable;
a display device and an operation device disposed in portions of said apparatus main body, the portions being not opened or closed by said cover;
said display device configured to display a character string, the display device including, on a common single display, an input character display screen, a conversion candidate display screen, and a text display screen;
a tape feeding roller driving shaft that is disposed in said cassette attachment part and is configured to feed a printing tape provided from said tape cassette attached;
a printing device that is disposed in said cassette attachment part and is configured to print a character string on said printing tape fed;
said operation device configured to enable an operator to input an operation, wherein a character input by the operator is displayed on the input character display screen;
said operation device including:
a conversion key configured to be used to display said at least one conversion candidate associated with the character displayed on the input character display screen;
a selective final determination key configured to be used to finally determinate a character string selected from the conversion candidates displayed on said conversion candidate display screen as a finally-determined character string;
a print key configured to be used to output character string data displayed on said text display screen to said printing device and to issue a printing instruction;
the printing apparatus further comprising:
a conversion candidate creating portion configured to create at the time of an operation of said conversion key at least one conversion candidate associated with the character string inputted by the operator with said operation device and to display the created conversion candidate on the conversion candidate display screen of said display device;
a shortened character string creating portion configured to create a shorted character string formed of one character or two character on the basis of the character string inputted by the operator with said operation device; and
a finally-determined character string output portion configured to, based on an operation of said selective final determination key by the operator with said operation device associated with the display of said conversion candidate in said conversion candidate display screen of said display device, display the corresponding conversion candidate as said finally-determined character string on the text display screen of said display device; and
a learning portion configured to learn and store for the next input operation and creation of at least conversion candidate, wherein
the operator is capable of performing an editing operation of the finally-determined character string on the text display screen so that the finally-determined character string on the text display screen is different from the character string at the time of the operation of said selective final determination key by the operator,
the printing apparatus further comprises a control portion having a first mode and a second mode, wherein in the first mode the control portion controls said printing device and said learning portion so that said printing device at the time of input of the printing instruction by the operator with said print key different from the time of the operation of said selective final determination key after the editing operation, prints on said printing tape character string data displayed on said text display screen and said learning portion, at the time of the input of the printing instruction by the operator with said print key different from the time of the operation of said selective final determination key, after the editing operation, learns and stores the shorted character string formed of one character or two characters created by said shortened character string creating portion based on the character string that was input at the time before the first time of an operation of said conversion key, associated with character string data displayed on said text display screen of said display device at the time of the input of the printing instruction, wherein the second mode the control portion controls said printing device and said learning portion so that said printing device at the time of the operation of said selective final determination key after the editing operation, prints on said printing tape character string data displayed on said text display screen and said learning portion at the time of the operation of said selective final determination key after the editing operation, learns and stores the shorted character string formed of one character or two characters created by said shortened character string creating portion based on the character string that was input at the time before the first time of an operation of said conversion key associated with character string data displayed on said text display screen of said display device at the time of the operation of said selective determination key and wherein said editing operation includes an operation for abbreviating said finally-determined character string by the operator, and said operation device includes a mode changeover switch configured to switch said first mode and said second mode, selectively.

2. The printing apparatus according to claim 1, wherein:

said editing operation further includes an operation for deleting a part of said finally-determined character string by the operator.

3. The printing apparatus according to claim 1, wherein:

said editing operation further includes an operation for adding a character to said finally-determined character string by the operator.

4. The printing apparatus according to claim 1, wherein:

said control portion controls said learning portion so that said learning portion performs said learning and storage including a creation of conversion candidates using a language dictionary conversion program.

* * * * *